US006270411B1

(12) United States Patent
Gura et al.

(10) Patent No.: US 6,270,411 B1
(45) Date of Patent: Aug. 7, 2001

(54) GAMING MACHINE WITH ANIMATED REEL SYMBOLS FOR PAYOFF

(75) Inventors: Damon E. Gura, Chicago; Joel R. Jaffe, Evanston; Ismaelito B. Raneses, Des Plaines, all of IL (US)

(73) Assignee: WMS Gaming Inc., Chicago, IL (US)

( * ) Notice: Subject to any disclaimer, the term of this patent is extended or adjusted under 35 U.S.C. 154(b) by 0 days.

(21) Appl. No.: 09/393,492

(22) Filed: Sep. 10, 1999

(51) Int. Cl.[7] .......... A63F 13/00

(52) U.S. Cl. .......... 463/20; 463/22; 463/13; 273/138; 273/146; 273/143

(58) Field of Search .......... 463/20, 22, 3, 463/13; 273/146, 143, 138, 145

(56) References Cited

U.S. PATENT DOCUMENTS

| | | | | |
|---|---|---|---|---|
| 3,357,703 | * | 12/1967 | Hurley | 273/138 A |
| 4,506,890 | * | 3/1985 | Murry | 273/138 A |
| 4,909,513 | * | 3/1990 | Kiyono | 273/145 R |
| 5,031,914 | * | 7/1991 | Rosenthal | 273/146 |
| 5,259,616 | * | 11/1993 | Bergmann | 273/138 A |
| 5,393,057 | * | 2/1995 | Marnell, II | 273/85 CP |
| 5,393,061 | | 2/1995 | Manship et al. . | |
| 5,580,053 | * | 12/1996 | Crouch | 463/20 |
| 5,697,843 | * | 12/1997 | Manship et al. | 463/20 |
| 5,779,549 | | 7/1998 | Walker et al. | 463/42 |
| 6,004,208 | * | 12/1999 | Takemoto et al. | 463/20 |
| 6,056,642 | | 5/2000 | Bennett . | |
| 6,086,066 | * | 7/2000 | Takeuchi et al. | 273/143 R |
| 6,089,977 | * | 7/2000 | Bennett | 463/20 |
| 6,089,978 | * | 7/2000 | Adams | 463/20 |
| 6,093,102 | * | 7/2000 | Bennett | 463/20 |

FOREIGN PATENT DOCUMENTS

| | | | |
|---|---|---|---|
| 27 26 145 | 12/1978 | (DE) | G07F/17/34 |
| 2 106 685 | 4/1983 | (GB) | G07F/17/34 |
| 2 262 642 | 6/1993 | (GB) | G07F/17/34 |
| WO 99/10849 | 3/1999 | (WO) | G07F/17/34 |
| WO 99/64997 | 12/1999 | (WO) . | |
| WO 00/32286 | 6/2000 | (WO) . | |

OTHER PUBLICATIONS

Advertisement; "Penguin Pays," Aristocrat Incorporated, 1998.

Article; "Wild Cougar," Aristocrat Leisure Industries; *Stictly Slots,* Feb. 1999, pp. 44.

Brochure; "Wild Cougar," Feb. 1994, 2 pp.

Article; "The Full Monty, Shuffle Master, Bally Gaming and Monty Hall bring *Let's Make a Deal* to the slot floor," *Strictly Slots,* Jun. 1999, pp. 48–51.

Product Sheet; "Great Whites," Anchor Gaming, 2000 (but believed to be available about 1998).

Brochure; "Neptune's Pearls," Unidesa Gaming, 1998, 4 pp.

* cited by examiner

*Primary Examiner*—Steven Wong
*Assistant Examiner*—Dolores R. Collins
(74) *Attorney, Agent, or Firm*—Jenkens & Gilchrist

(57) ABSTRACT

A gaming machine comprising a presentation element controlled by a processor in response to a wager amount. The presentation element is capable of presenting a basic game screen and a start animation outcome that activates an animation feature. The animation feature represents an animation game being played and results in an animation outcome. The animation outcome provides an animation payoff. The animation feature covers a portion of the basic game screen less than all of the basic game screen.

35 Claims, 8 Drawing Sheets

GAMING MACHINE WITH ANIMATED REEL SYMBOLS FOR PAYOFF

FIELD OF THE INVENTION

The present invention relates generally to gaming machines and, more particularly, to gaming machines with animated reel symbols.

BACKGROUND OF THE INVENTION

Gaming machines, such as slot machines, video poker machines and the like, have been a cornerstone of the gaming industry for several years. Generally, the popularity of such machines with players is dependent on the likelihood (or perceived likelihood) of winning money at the machine and the intrinsic entertainment value of the machine relative to other available gaming options. Where the available gaining options include a number of competing machines and the expectation of winning each machine is roughly the same (or believed to be the same), players are most likely to be attracted to the most entertaining and exciting machines. Shrewd operators consequently strive to employ the most entertaining and exciting machines available, because such machines attract frequent play resulting in increased profitability for the operator.

To enhance the entertainment value of a gaming machine, features are added to the game such as an enhanced payoff, a "secondary" or "bonus" game which may be played in conjunction with a "basic" game. The features may comprise any type of game, either similar to or completely different from the basic game, which is entered upon the occurrence of a selected event or outcome of the basic game. Generally, the features provide a greater expectation of winning than the basic game and may also be accompanied with more attractive or unusual video displays and/or audio. Because the features offer tremendous advantages in player appeal and excitement relative to other known games, and because such games are attractive to both players and operators, there is a continuing need to develop gaming machines with new types of features to satisfy the demands of players and operators. The present invention is directed to satisfying this need.

SUMMARY OF THE INVENTION

In accordance with one aspect of the present invention, there is provided a gaming machine comprising a presentation element controlled by a processor in response to a wager amount. The presentation element is capable of presenting a start animation outcome that activates an animation feature. The animation feature represents an animation game being played and results in an animation outcome. The animation outcome provides an animation payoff. The animation feature occurs generally at a location on the presentation element where the start animation outcome was presented. The animation payoff may be a multiplier applied to the wager amount. Additionally, the animation payoff may be a credit awarded to a player.

In accordance with another aspect of the present invention, there is provided a gaming machine comprising a presentation element controlled by a processor in response to a wager amount. The presentation element is capable of presenting a basic game screen and a start animation outcome that activates an animation feature. The animation feature represents an animation game being played and results in an animation outcome. The animation outcome provides an animation payoff. The animation feature covers a portion of the basic game screen less than all of the basic game screen. The animation feature may be confined to an area larger than an area of the start animation outcome.

In another accordance with another aspect of the present invention, there is provided a method of operating a gaming machine under the control of a processor. The method comprises providing a basic game with at least one start bonus outcome, placing a wager amount on the game and playing the basic game. The method further provides a bonus game in response to the start bonus outcome. The bonus game provides an animation representing a game being played and resulting in a bonus game outcome that provides an animation payoff. The animation occurs generally at a location where the start bonus outcome was provided.

In accordance with yet another aspect of the present invention, there is provided a gaming machine comprising a basic game controlled by a processor in response to a wager amount. The basic game has a first display screen and at least one start bonus outcome that activates a bonus game. The activation of the bonus game causes the processor to provide an animation that covers a portion less than all of the first display screen. The animation occurs automatically without a triggering input from a player. The animation provides an animation payoff. The animation payoff may be a multiplier applied to the wager amount. Additionally, the animation payoff may be a credit awarded to the player.

In accordance with a further aspect of the present invention, there is provided a method of operating a gaming machine under control of a processor. The method comprises providing a basic game having at least one start animation outcome, placing a wager amount on the basic game and playing the basic game. The method further includes providing an animation in response to the start animation outcome. The animation occurs at a location of the start animation outcome and automatically provides an animation payoff.

BRIEF DESCRIPTION OF THE DRAWINGS

The foregoing and other advantages of the invention will become apparent upon reading the following detailed description and upon reference to the drawings in which.

Figure 1:
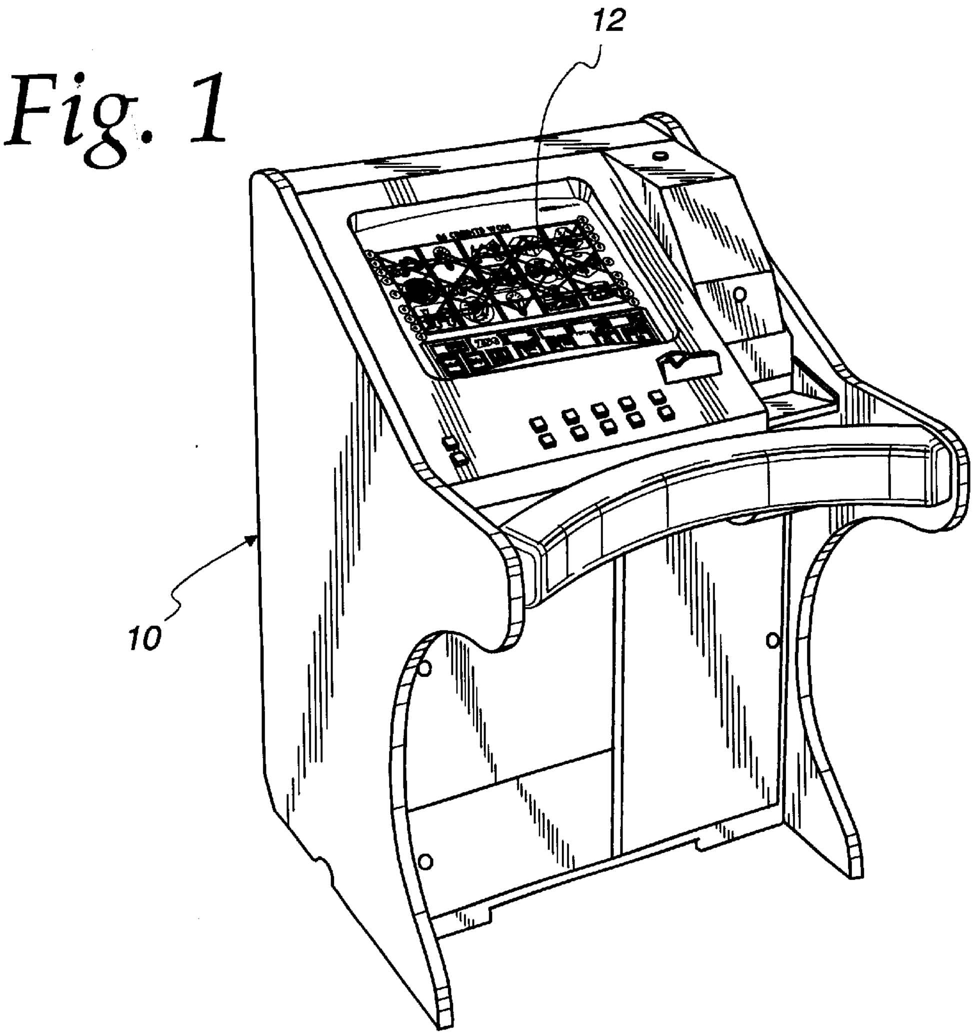
FIG. 1 is a perspective view of a video gaming machine operable to implement a reel animation feature according to one embodiment of the present invention.

While the invention is susceptible to various modifications and alternative forms, specific embodiments have been shown by way of example in the drawings, and will be described in detail herein. However, it should be understood that the invention is not intended to be limited to the particular forms disclosed. Rather, the invention is to cover all modifications, equivalents, and alternatives falling within the spirit and scope of the invention as defined by the appended claims.

DESCRIPTION OF SPECIFIC EMBODIMENTS

Turning now to the drawings and referring initially to FIG. 1, there is depicted a video gaming machine 10 which may be used to implement a basic game and a reel animation feature according to the present invention. The reel animation feature may also be called a first screen bonus game. The gaming machine 10 includes a video display 12 that in one embodiment comprises a touch-screen CRT display. Alternatively, the video display 12 may comprise a dot matrix, LED, LCD, electro-luminescent display or generally any type of video display known in the art. In the illustrated embodiment, the video gaming machine 10 comprises a "slant-top" version, in which the video display 12 is slanted at about a thirty-degree angle toward the player. It will be appreciated, however, that any of several other models of gaming machines are within the scope of the present invention including, for example, "upright" versions in which the video display 12 is oriented vertically relative to the player, or gaming machines which include mechanical, rather than video displays.

In one embodiment, the gaming machine 10 is operable to play a game entitled MONOPOLY—CHAIRMAN OF THE BOARD™ that features a basic game in the form of a slot machine with five simulated spinning reels (see FIG. 3) and first screen bonus game or a reel animation feature called a DICE ROLL mode. It will be appreciated, however, that the gaming machine 10 may be implemented with games other than the MONOPOLY—CHAIRMAN OF THE BOARD™ game and/or with any of several alternative game themes. Further embodiments of games operable on the gaming machine 10 include a PERFECT GAME™ game and WHODUNNIT?™ game that will be described below.

Figure 2:
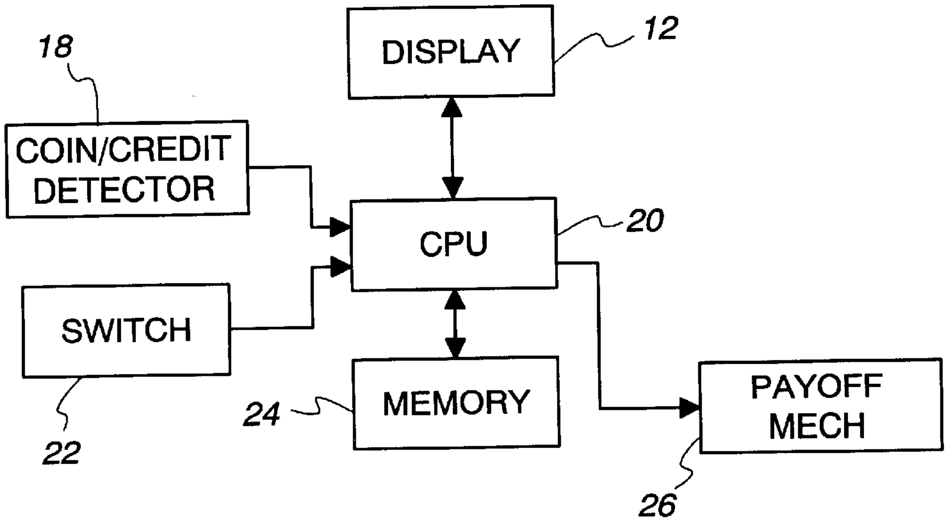
FIG. 2 is a block diagram of the video gaming machine of FIG. 1.

FIG. 2 is a block diagram of a control system suitable for operating the gaming machine 10. A coin/credit detector 18 signals a CPU 20 when a player has inserted a number of coins or played a number of credits. Then, the CPU 20 operates to execute a basic game program which causes the video display 12 to display the basic game which includes simulated reels with symbols displayed thereon (see FIG. 3). The basic game commences in response to the player activating a switch 22 (e.g., by pulling a lever or pushing a button). Once the player activates the switch 22, the CPU 20 sets the reels in motion, randomly selects a game outcome and then stops the reels to display symbols corresponding to the pre-selected game outcome. In one embodiment, certain basic game outcomes of the MONOPOLY—CHAIRMAN OF THE BOARD™ game cause the CPU 20 to enter a DICE ROLL mode. The DICE ROLL mode will be described in detail in relation to FIGS. 4–7. Other outcomes of the MONOPOLY—CHAIRMAN OF THE BOARD™ game cause the CPU 20 to enter a separate second screen bonus causing the video display 12 to show a bonus game such as the bonus game described in Ser. No. 09/274,793 entitled "Gaming Machines With Board Game Theme" assigned to the present assignee and incorporated herein by reference. Similarly, in one embodiment of the PERFECT GAME™ game, certain basic game outcomes cause the CPU 20 to enter a first screen bonus game or animation feature called a BOWLING ROLL mode. The BOWLING ROLL mode will be described in detail in relation to FIGS. 8–12. Likewise, in one embodiment of the WHODUNNIT?™ game, certain basic game outcomes cause the CPU 20 to enter a first screen bonus game or animation feature called MAGNIFYING GLASS mode. The MAGNIFYING GLASS mode will be described in derail in relation to FIGS. 13–15.

A system memory 24 stores control software, operational instructions and data associated with the gaming machine 10. In one embodiment, the memory 24 comprises a separate read-only memory (ROM) and battery-backed random-access memory (RAM). However, it will be appreciated that the system memory 24 may be implemented on any of several alternative types of memory structures or may be implemented on a single memory structure. A payoff mechanism 26 is operable in response to instructions from the CPU 20 to award a payoff of coins or credits to the player in response to certain winning outcomes which might occur in the basic game or bonus game. The payoff amounts corresponding to certain combinations of symbols in the basic game is predetermined according to a pay table stored in system memory 24. The payoff amounts corresponding to certain outcomes of the animation features and bonus game are also stored in system memory 24.

Figure 3:
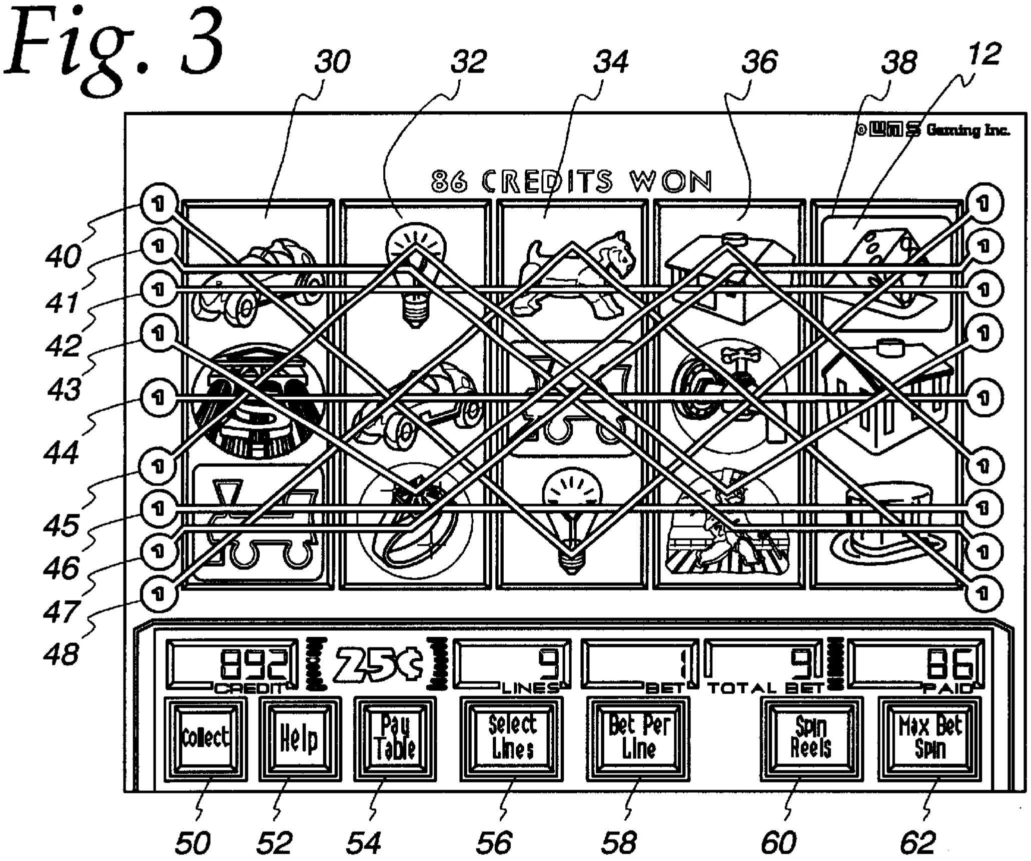
FIG. 3 is an illustration of a five-reel, nine-line game which is played on the video display of the video gaming machine of FIG. 1 according to one embodiment of the present invention.

As shown in FIG. 3, the MONOPOLY—CHAIRMAN OF THE BOARD™ game is implemented on the video display 12. The CPU 20 provides a basic game screen comprising five video simulated spinning reels 30, 32, 34, 36 and 38 (hereinafter "reels") with nine paylines 40–48. Generally, game play is initiated by inserting a number of coins or playing a number of credits, causing the CPU 20 (FIG. 2) to activate a number of paylines corresponding to the number of coins or credits played. In one embodiment, the player selects the number of paylines (between one and nine) to play by pressing the "Select Lines" key 56 on the video display 12. The player then chooses the number of coins or credits to bet on the selected paylines by pressing the "Bet Per Line" key 58.

After activation of the paylines, the reels 30, 32, 34, 36 and 38 may be set in motion by touching the "Spin Reels" key 60 or, if the player wishes to bet the maximum amount per line, by using the "Max Bet Spin" key 62 on the video display 12. Alternatively, other mechanisms such as, for example, a lever or push button may be used to set the reels in motion. The CPU 20 uses a random number generator (not shown) to select a game outcome corresponding to a particular set of reel "stop positions." The CPU 20 then causes each of the video reels 30, 32, 34, 36 and 38 to stop at the appropriate stop position. Video symbols are displayed on the reels 30, 32, 34, 36 and 38 to graphically illustrate the reel stop position and indicate whether the stop position of the reels represents a winning game outcome.

The various video symbols on reels 30 through 38 in one embodiment of the MONOPOLY—CHAIRMAN OF THE BOARD™ game relate to the MONOPOLY board game. The various symbols used in one embodiment of the MONOPOLY—CHAIRMAN OF THE BOARD™ game include: "BANK," "HOTEL," "HOUSE," "HAT," "CAR," "DOG," "PARKING," "TRAIN," "RING," "BULB ," "WATER WORKS," "BOARDWALK" and "DICE."

In the embodiment of FIG. 3, three symbols are displayed at three respective display positions (i.e., "upper," "center" and "lower") on each reel 30, 32, 34, 36, 38 thus defining a symbol group of fifteen symbols for each game outcome. Specifically, in the illustrated embodiment, reel 30 includes a "CAR" symbol in the upper display position, a "BANK" symbol in the center display position and a "TRAIN" symbol in the lower display position. Reel 32 includes a "BULB" symbol in the upper display position, a "CAR" symbol in the center display position and a "RING" symbol in the lower display position. Reel 34 includes a "DOG" symbol in the upper display position, a "TRAIN" symbol in the center display position and a "BULB" symbol in the lower display position. Reel 36 includes a "HOUSE" symbol in the upper display position, a "WATER WORKS" symbol in the center display position and a "BOARDWALK" symbol in the lower display position. Reel 38 includes a "DICE" symbol in the upper display position, a "HOTEL" symbol in the center display position and a "HAT" symbol in the lower display position.

In the embodiment of FIG. 3, each of the paylines 40–48 extend through one symbol on each of the five reels 30, 32, 34, 36 and 38. Payline 40 starts at the upper left symbol (e.g., "CAR") on reel 30, extends through the center symbol (e.g., "CAR") on reel 32, the lower symbol (e.g., "BULB") on reel 34, the center symbol (e.g., "WATER WORKS") on reel 36 and terminates at the top symbol (e.g., "DICE") on reel 38. Payline 41 starts at the upper left symbol (e.g., "CAR") on reel 30, extends through the upper symbol (e.g., "BULB") on reel 32, the center symbol (e.g., "TRAIN") on reel 34, the lower symbol (e.g., "BOARDWALK") on reel 36 and terminates at the lower symbol (e.g., "HAT") on reel 38. Payline 42 extends through the top symbol on each reel (e.g., "CAR" on reel 30, "BULB" on reel 32, "DOG" on reel 34, "HOUSE" on reel 36 and "DICE" on reel 38.) Payline 43 starts at the center symbol (e.g., "BANK") on reel 30, extends through the lower symbol (e.g., "RING") on reel 32, the center symbol (e.g., "TRAIN") on reel 34, the top symbol (e.g., "HOUSE") on reel 36 and terminates at the center symbol (e.g., "HOTEL") on reel 38. Payline 44 extends through the center symbol on each reel (e.g., "BANK" on reel 30, "CAR" on reel 32, "TRAIN" on reel 34, "WATER WORKS" on reel 36, and "HOTEL" on reel 38.) Payline 45 starts at the center symbol (e.g., "BANK") on reel 30, extends through the upper symbol (e.g., "BULB") on reel 32, the center symbol (e.g., "TRAIN") on reel 34, the lower symbol (e.g., "BOARDWALK") on reel 36 and terminates at the center symbol (e.g., "HOTEL") on reel 38. Payline 46 extends through the lower symbol on each reel (e.g., "TRAIN" on reel 30, "RING" on reel 32, "BULB" on reel 34, "BOARDWALK" on reel 36 and "HAT" on reel 38.) Payline 47 starts at the lower symbol (e.g., "TRAIN") on reel 30, extends through the lower symbol (e.g., "RING") on reel 32, the center symbol (e.g., "TRAIN") on reel 34, the upper symbol (e.g., "HOUSE") on reel 36 and terminates at the upper symbol (e.g., "DICE") on reel 38. Payline 48 starts at the lower symbol (e.g., "TRAIN") on reel 30, extends through the center symbol (e.g., "CAR") on reel 32, the upper symbol (e.g., "DOG") on reel 34, the center symbol (e.g., "WATER WORKS") on reel 36 and terminates at the lower symbol (e.g., "HAT") on reel 38.

In one embodiment, the CPU 20 checks the symbol groups of the "basic" game outcomes for winning combinations. Certain predefined winning symbol combinations appearing in the symbol group relative to an active payline are winning outcomes. The winning combinations are preferably identified on a pay table that is affixed to the machine 10 and/or displayed by the video display 12 in response to a command by the player (e.g., by pressing the "Pay Table" button 54). The pay table enables the player to view the winning combinations and their associated payoff amounts. If the symbol group includes a winning combination, the game credits the player an amount corresponding to the award in the pay table for that combination multiplied by the amount of credits bet. The player may collect the amount of accumulated credits by pressing the "Collect" button 50.

TABLE 1

MONOPOLY- CHAIRMAN OF THE BOARD ™ PAY TABLE

| WIN COMBINATIONS | | | | | PAY |
|---|---|---|---|---|---|
| Bank | Bank | Bank | Bank | Bank | 10000 |
| Bank | Bank | Bank | Bank | | 500 |
| Bank | Bank | Bank | | | 50 |
| Bank | Bank | | | | 5 |
| Bank | | | | | 2 |
| Hotel | Hotel | Hotel | Hotel | Hotel | 1000 |
| Hotel | Hotel | Hotel | Hotel | | 100 |
| Hotel | Hotel | Hotel | | | 25 |
| House | House | House | House | House | 1000 |
| House | House | House | House | | 75 |
| House | House | House | | | 25 |
| Hat | Hat | Hat | Hat | Hat | 1000 |
| Hat | Hat | Hat | Hat | | 60 |
| Hat | Hat | Hat | | | 25 |
| Car | Car | Car | Car | Car | 500 |
| Car | Car | Car | Car | | 50 |
| Car | Car | Car | | | 20 |
| Dog | Dog | Dog | Dog | Dog | 300 |
| Dog | Dog | Dog | Dog | | 40 |
| Dog | Dog | Dog | | | 15 |
| Parking | Parking | Parking | Parking | Parking | 200 |
| Parking | Parking | Parking | Parking | | 30 |
| Parking | Parking | Parking | | | 12 |
| Train | Train | Train | Train | Train | 150 |
| Train | Train | Train | Train | | 20 |
| Train | Train | Train | | | 10 |
| Ring | Ring | Ring | Ring | Ring | 100 |
| Ring | Ring | Ring | Ring | | 15 |
| Ring | Ring | Ring | | | 5 |
| Bulb | Bulb | Bulb | Bulb | Bulb | 100 |
| Bulb | Bulb | Bulb | Bulb | | 15 |
| Bulb | Bulb | Bulb | | | 5 |
| Boardwalk | Boardwalk | Boardwalk | Boardwalk | Boardwalk | 1000 |
| Boardwalk | Boardwalk | Boardwalk | Boardwalk | | 100 |
| Boardwalk | Boardwalk | Boardwalk | | | 5 |

Table 1 is a pay table identifying various winning combinations of symbols in the MONOPOLY—CHAIRMAN OF THE BOARD™ basic game. The "WIN COMBINATIONS" portion identifies the various symbol combinations providing a payoff when they stop on the designated reels of an active payline. The specific type(s) and number(s) of symbol combinations define the various winning combinations. Generally, except for the "BANK" combination, winning combinations require that at least three of five corresponding symbols be displayed on an active payline on the designated reels. The basic game is a left and right pay, so three BULB symbols on reels 30 through 34 and three BULB symbols on reels 34 through 38 are winning combinations. For example, the symbol combinations of five "HOTEL" symbols (i.e. on reels 30 through 38), four "HOTEL" symbols (i.e. on reels 30 through 36 or reels 32 through 38) and three "HOTEL" symbols (i.e. on reels 30 through 34 or reels 34 through 38) stopping on an active payline provide a payoff. As shown in Table 1, the "BANK" symbol has five winning combinations in the MONOPOLY—CHAIRMAN OF THE BOARD™ basic game, including: five "BANK" symbols (i.e. on reels 30 through 38), four "BANK" symbols (i.e. on reels 30 through 36 or reels 32 through 38), three "BANK" symbols (i.e. on reels 30 through 34 or reels 34 through 38), two "BANK" symbols (i.e. on reels 30 through 32 or reels 36 through 38), and one "BANK" symbol (i.e. on reel 30 or reel 38).

The "PAY" column of Table 1 identifies the amount of coin(s) or credit(s) awarded as the payoff for the various winning combinations in the basic game, per unit wagered. Thus, for example, the "BANK," "BANK" combination will pay five coins or credits with one coin played; that same combination will pay twenty-five coins or credits with five coins played.

Figure 4:
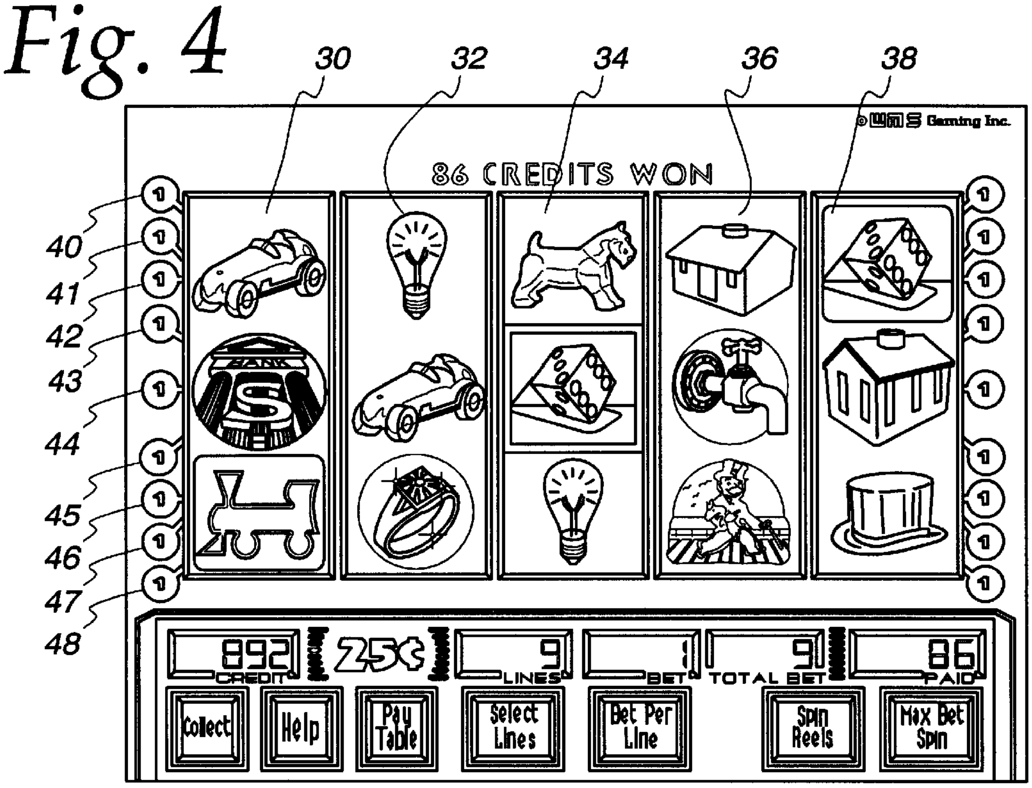
FIG. 4 shows an outcome of the game of FIG. 3 which will trigger a DICE ROLL mode.

In one embodiment, two or three "DICE" symbols appearing in any position on any of the reels triggers the animation feature or first screen bonus game termed the DICE ROLL mode. Unlike the basic game, the DICE ROLL mode operates in a scatter pay format. An example is shown in FIG. 4 with two "DICE" symbols on reels 34 and 38. As shown in Table 1, two or more "DICE" symbols do not provide a payoff in the basic game. However, a significant award may be expected from the DICE ROLL mode. It will be appreciated, however, that alternative embodiments within the scope of the present invention might provide a payoff for the combination of two or three "DICE" symbols prior to the DICE ROLL mode.

Figure 5:
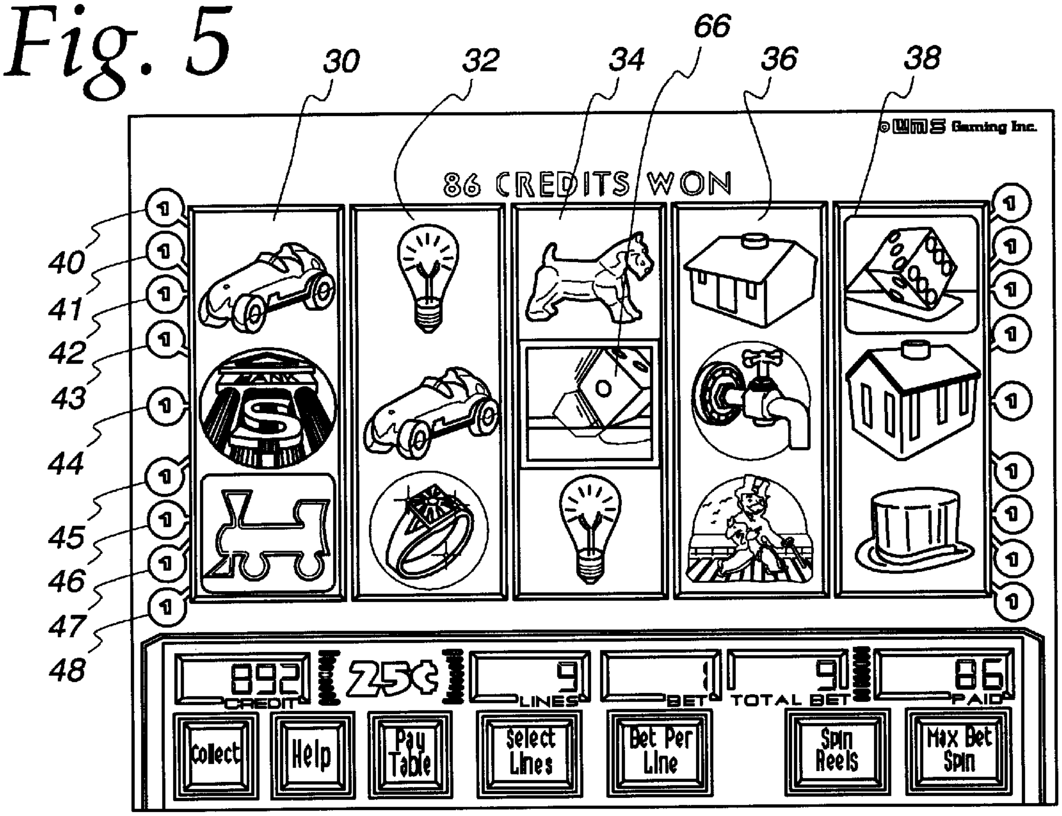
FIG. 5 shows an example animation of the DICE ROLL mode.
Figure 6:
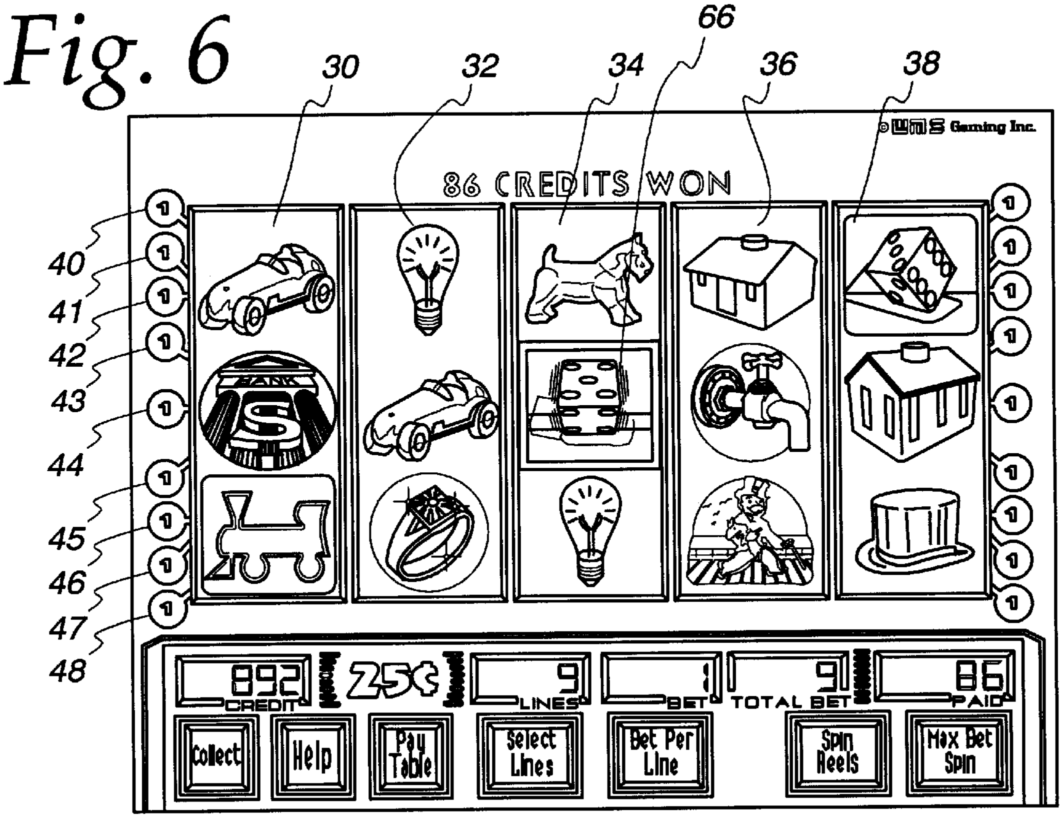
FIG. 6 shows an example of further animation of the DICE ROLL mode.

Once the DICE ROLL mode becomes active the CPU 20 provides a dice game. Specifically, the CPU 20 randomly selects a dice face value to display for each of the "DICE" symbols. Each of the six sides of the dice has an equal probability of being the displayed dice face value just like any roll of physical dice. The CPU 20 then animates the "DICE" symbols to display the chosen dice face values. The animation of the dice roll occurs automatically without a triggering input from the player. For example, the CPU 20 causes one of the "DICE" symbols to "roll" on the display within its symbol box on its reel. As depicted in FIGS. 5 and 6, the DICE ROLL mode animates the roll motion of the dice at the center position of reel 34 within its symbol box 66 before coming to a rest in FIG. 7. Although FIGS. 5–7 depict the dice roll animation confined generally within the "DICE" symbol box 66, in an alternative embodiment, the animation is not confined within the "DICE" symbol boxes.

Figure 7:
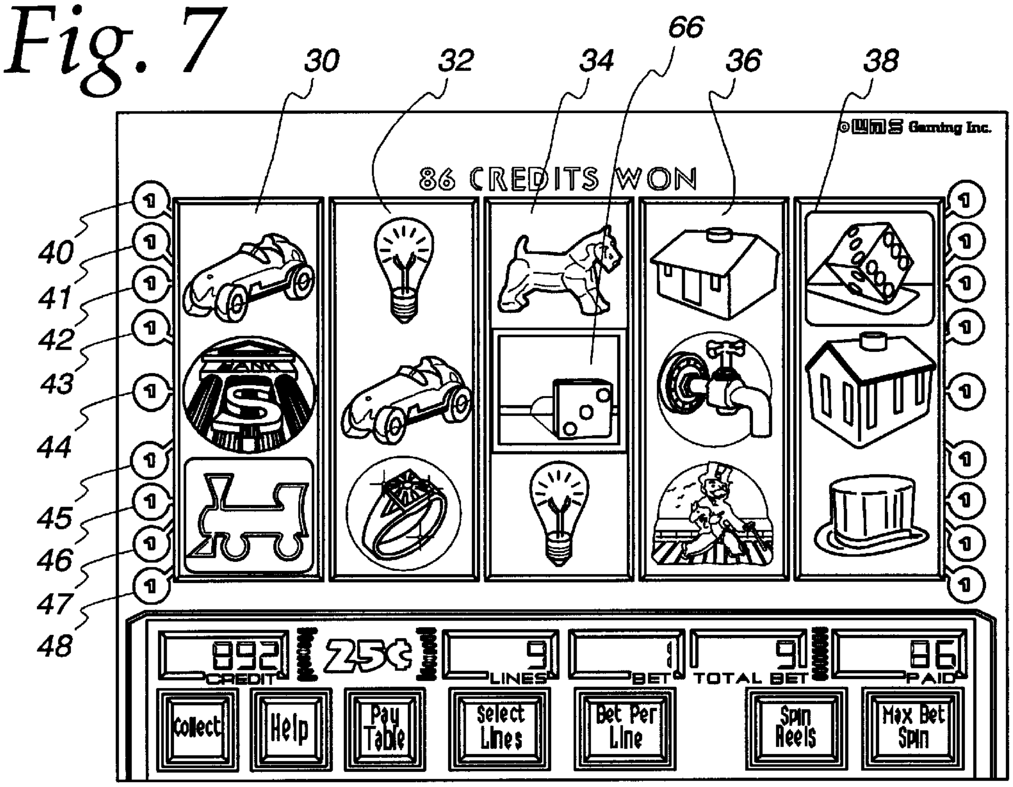
FIG. 7 shows an example of the results of the animation of the DICE ROLL mode.

As depicted in FIG. 7, the "DICE" symbol in the center position on reel 34 has stopped rolling with a three showing as its dice face value. Once the first dice in the center position on reel 34 begins rolling, the CPU 20 also animates the roll of the other dice within its symbol box in the upper position of reel 38. Although not shown in the figures, the second "DICE" animated roll is similar to the first "DICE" roll shown in FIGS. 5 and 6 with the dice stopping to display the preselect dice face value. In another embodiment, three "DICE" symbols may appear on the reels. For this three dice embodiment, once the second dice begin rolling, the CPU 20 animates a third "DICE" symbol to roll similar to the first and second "DICE" symbols as described above.

Once the "DICE" symbols have "rolled" and displayed their dice face values in their symbol boxes, the CPU 20 provides an award to the player based on the result of the dice games, namely the displayed dice face values. In one embodiment, the product of the displayed die faces is multiplied by the total bet to yield the payoff to the player. For example, if two "DICE" symbols roll and stop with dice face values of three and six, the product payoff would be eighteen coins or credits (three times six) for a total bet of one coin played. That same combination will pay ninety coins or credits for the total bet of five coins played. Thus, for two dice in the DICE ROLL mode, the payoff will be between one and thirty-six times the total bet. For three dice in the DICE ROLL mode, the payoff will be between one and 216 times the total bet.

In an alternative embodiment, the sum of the displayed die face values may be multiplied by the total bet to yield the payoff to the player. For example, if two "DICE" symbols roll and stop with dice face values of three and six, the payoff would be nine coins or credits (three plus six) with a total bet of one coin. That same combination will pay forty-five coins or credits for a bet of five coins. In a further embodiment, the payoff of the DICE ROLL mode may be just the sum or product of the dice face values. For example, with displayed dice face values of three and six, the sum payoff would be nine credits or coins and the product payoff would be eighteen credits.

In yet another embodiment, the sum or product of the displayed die face values may be used as a multiplier applied to a basic game winning combination. For example, the basic game winning combination of two "BANK" symbols that pays two coins or credits may appear with the two "DICE" symbols. The basic game payoff may be multiplied by either the sum or product of the displayed dice face values. If the "DICE" symbols roll and stop with dice face values of three and six, for instance, the sum of the die face values, namely nine, may be multiplied by the basic payoff of two for a total payoff of eighteen coins or credits. In another embodiment, the product of the die face values, namely eighteen, may be multiplied by the basic payoff of two for a total payoff of thirty-six coins or credits. After the CPU 20 has paid or credited the player with the DICE ROLL mode payoff, the CPU 20 returns to the basic game.

It will be appreciated that the present invention has generally been described with reference to a particular embodiment of the MONOPOLY—CHAIRMAN OF THE BOARD™ game, but the present invention is not limited to the particular embodiments described herein. For example, while the aforementioned game has a basic game in the form of a slot machine, the present invention may be implemented with virtually any type of game of chance or skill or combination of such games. The basic game may comprise, for example, a video poker or video blackjack game. Other variations within the scope of the present invention include animation features with different themes, different displays and/or different types of award presentations; basic games with different numbers and types of reels and/or symbols, different payoff modes and/or payline configurations; and basic game, animation features or bonus games with different coin awards.

Figure 8:
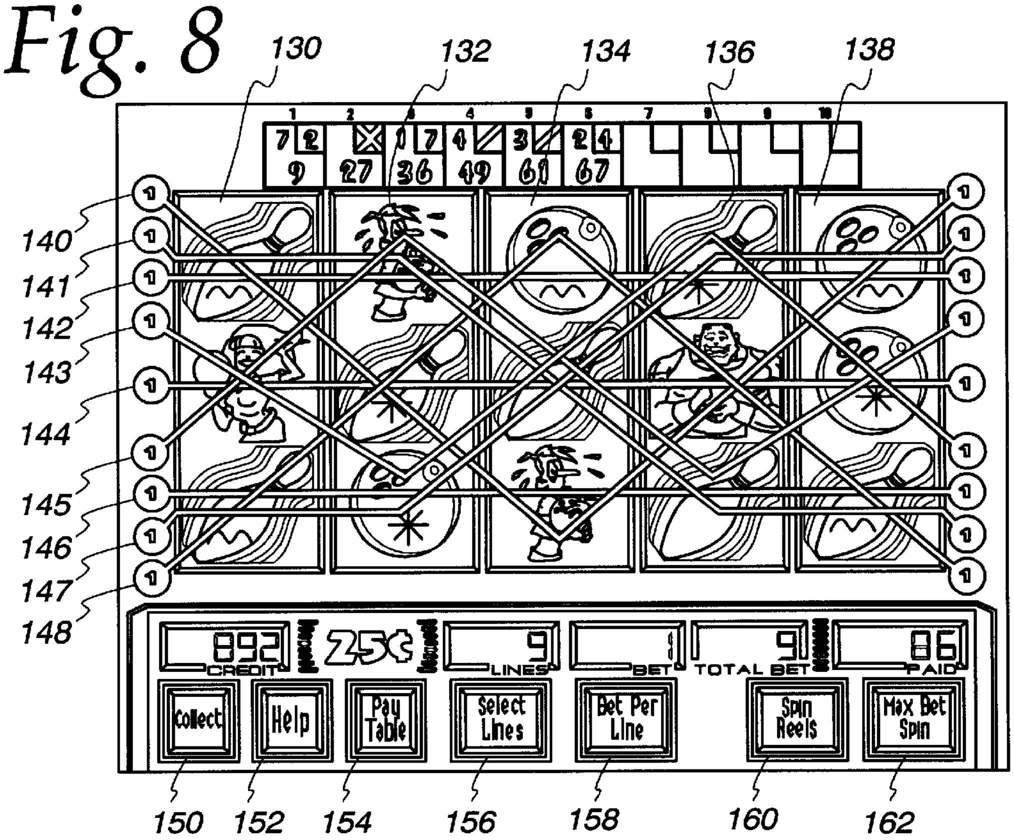
FIG. 8 is an illustration of a five-reel, nine-line game which is played on the video display of the video gaming machine of FIG. 1 according to another embodiment of the present invention.

The PERFECT GAME™ game is another game with a basic game and a reel animation feature or first screen bonus game that may be implemented on the video gaming machine 10. As shown in FIG. 8, the PERFECT GAME™ game is implemented on the video display 12. The CPU 20 provides a basic game screen comprising five video simulated spinning reels 130, 132, 134, 136 and 138 (hereinafter "reels") with nine paylines 140–148 similar to the MONOPOLY—CHAIRMAN OF THE BOARD™ game described above. Generally, game play is initiated by inserting a number of coins or playing a number of credits, causing the CPU 20 (FIG. 2) to activate a number of paylines corresponding to the number of coins or credits played. In one embodiment, the player selects the number of paylines (between one and nine) to play by pressing the "Select Lines" key 156 on the video display 12. The player then chooses the number of coins or credits to bet on the selected paylines by pressing the "Bet Per Line" key 158.

After activation of the paylines, the reels 130, 132, 134, 136 and 138 may be set in motion by touching the "Spin Reels" key 160 or, if the player wishes to bet the maximum amount per line, by using the "Max Bet Spin" key 162 on the video display 12. Alternatively, other mechanisms such as, for example, a lever or push button may be used to set the reels in motion. The CPU 20 uses a random number generator (not shown) to select a game outcome corresponding to a particular set of reel "stop positions." The CPU 20 then causes each of the video reels 130, 132, 134, 136 and 138 to stop at the appropriate stop position. Video symbols are displayed on the reels 130, 132, 134, 136 and 138 to graphically illustrate the reel stop position and indicate whether the stop position of the reels represents a winning game outcome.

The various video symbols on reels 130 through 138 in one embodiment of the PERFECT GAME™ game relate to a bowling game. The various symbols used in one embodiment of the BOWL™ game include: "LOGO," "WILD TURKEY," "BOWLING TROPHY," "STRIKE SYMBOL," "BOWLING SHIRT," "BOWLING BAG," "BOWLING SHOES," "PLAIN PIN," "WAVE PIN," "STAR PIN," "STAR BALL," "WAVE BALL," "LADY," "WIMPY GUY," and "BRUISER."

In the embodiment of FIG. 8, three symbols are displayed at three respective display positions (i.e., "upper," "center" and "lower") on each reel 130, 132, 134, 136, 138 thus defining a symbol group of fifteen symbols for each game outcome. Specifically, in the illustrated embodiment, reel 130 includes a "WAVE PIN" symbol in the upper display position, a "LADY" symbol in the center display position and a "WAVE PIN" symbol in the lower display position. Reel 132 includes a "WIMPY GUY" symbol in the upper display position, a "STAR PIN" symbol in the center display position and a "STAR BALL" symbol in the lower display position. Reel 134 includes a "WAVE BALL" symbol in the upper display position, a "PLAIN PIN" symbol in the center display position and a "WIMPY GUY" symbol in the lower display position. Reel 136 includes a "STAR PIN" symbol in the upper display position, a "BRUISER" symbol in the center display position and a "PLAIN PIN" symbol in the lower display position. Reel 138 includes an "WAVE BALL" symbol in the upper display position, a "STAR BALL" symbol in the center display position and a "WAVE PIN" symbol in the lower display position.

In the embodiment of FIG. 8, each of the paylines 140–148 extends through one symbol on each of the five reels 130, 132, 134, 136 and 138. Payline 140 starts at the upper left symbol (e.g., "WAVE PIN") on reel 130, extends through the center symbol (e.g., "STAR PIN") on reel 132, the lower symbol (e.g., "WIMPY GUY") on reel 134, the center symbol (e.g., "BRUISER") on reel 136 and terminates at the top symbol (e.g., "WAVE BALL") on reel 138. Payline 141 starts at the upper left symbol (e.g., "WAVE PIN") on reel 130, extends through the upper symbol (e.g., "WIMPY GUY") on reel 132, the center symbol (e.g., "PLAIN PIN") on reel 134, the lower symbol (e.g., "PLAIN PIN") on reel 136 and terminates at the lower symbol (e.g., "WAVE PIN") on reel 138. Payline 142 extends through the top symbol on each reel (e.g., "WAVE PIN" on reel 130, "WIMPY GUY" on reel 132, "WAVE BALL" on reel 134, "STAR PIN" on reel 136 and "WAVE BALL" on reel 138.) Payline 143 starts at the center symbol (e.g., "LADY") on reel 130, extends through the lower symbol (e.g., "STAR BALL") on reel 132, the center symbol (e.g., "PLAIN PIN") on reel 134, the top symbol (e.g., "STAR PIN") on reel 136 and terminates at the center symbol (e.g., "STAR BALL") on reel 138. Payline 144 extends through the center symbol on each reel (e.g., "LADY" on reel 130, "STAR PIN" on reel 132, "PLAIN PIN" on reel 134, "BRUISER" on reel 136 and "STAR BALL" on reel 138.) Payline 145 starts at the center symbol (e.g., "LADY") on reel 130, extends through the upper symbol (e.g., "WIMPY GUY") on reel 132, the center symbol (e.g., "WAVE PIN") on reel 134, the lower symbol (e.g., "PLAIN PIN" on reel 136 and terminates at the center symbol (e.g., "STAR BALL") on reel 138. Payline 146 extends through the lower symbol on each reel (e.g., "WAVE PIN" on reel 130, "STAR BALL" on reel 132, "WIMPY GUY" on reel 134, "PLAIN PIN" on reel 136 and WAVE "PIN" on reel 138.) Payline 147 starts at the lower symbol (e.g., "WAVE PIN") on reel 130, extends through the lower symbol (e.g., "STAR BALL") on reel 132, the center symbol (e.g., "PLAIN PIN") on reel 134, the upper symbol (e.g., "STAR PIN") on reel 136 and terminates at the upper symbol (e.g., "WAVE BALL") on reel 138. Payline 148 starts at the lower symbol (e.g., "WAVE PIN") on reel 130, extends through the center symbol (e.g., "STAR PIN") on reel 132, the upper symbol (e.g., "WAVE BALL") on reel 134, the center symbol (e.g., "BRUISER") on reel 136 and terminates at the lower symbol (e.g., "WAVE PIN") on reel 138.

In one embodiment, the CPU 20 checks the symbol groups of the "basic" game outcomes for winning combinations. Certain predefined winning symbol combinations appearing in the symbol group relative to an active payline are winning outcomes. The winning combinations are preferably identified on a pay table that is affixed to the machine 10 and/or displayed by the video display 12 in response to a command by the player (e.g., by pressing the "Pay Table" button 154). The pay table for the PERFECT GAME™ game may be similar to Table 1 above with varying payoff amounts for various winning combinations. The pay table enables the player to view the winning combinations and their associated payoff amounts. If the symbol group includes a winning combination, the game credits the player an amount corresponding to the award in the pay table for that combination multiplied by the amount of credits bet. The player may collect the amount of accumulated credits by pressing the "Collect" button 150. The specific type(s) and number(s) of symbol combinations define the various winning combinations. Generally, winning combinations require that at least three of five corresponding symbols be displayed on the active payline on the designated reels.

Figure 9:
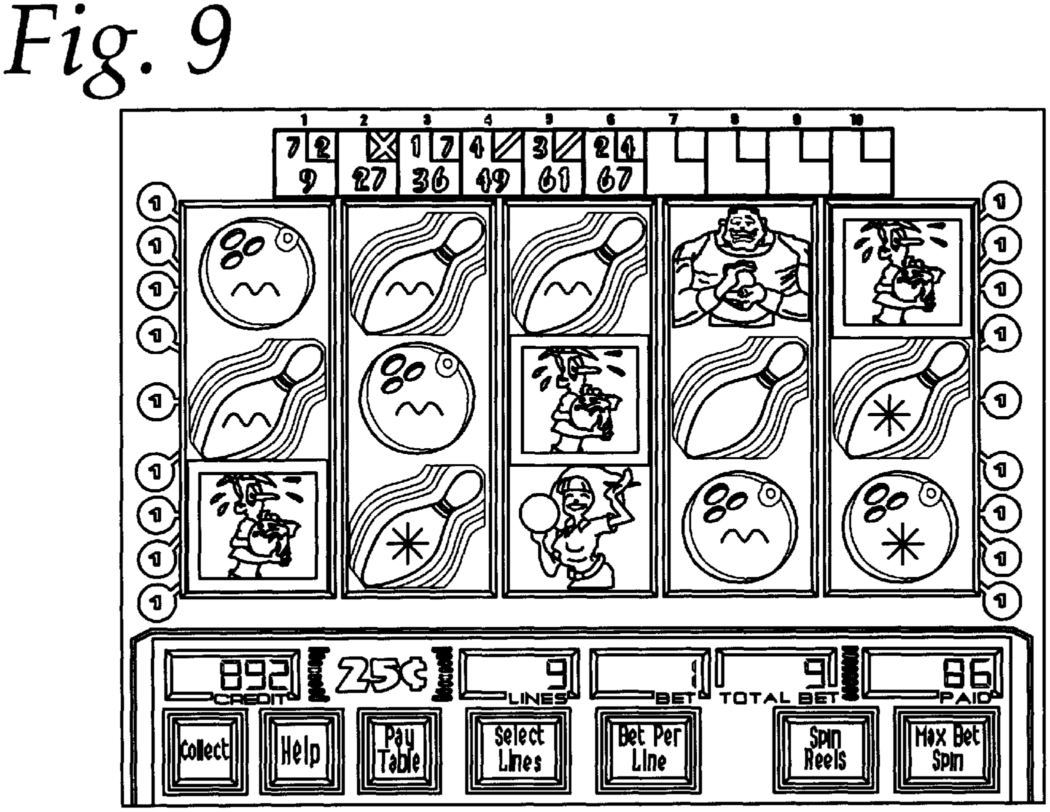
FIG. 9 shows an outcome of the game of FIG. 3 which will trigger a BOWLING ROLL mode.

In one embodiment, a "BRUISER," a "LADY," or a "WIMPY GUY" symbol positioned anywhere on each of the reels 130, 134 and 138 triggers the first screen bonus game or animation feature termed the BOWLING ROLL mode. The BOWLING ROLL mode provides an animation of a bowling game. An example of the BOWLING ROLL mode trigger is shown in FIG. 9 with the "WIMPY GUY" symbols on reels 130, 134 and 38. The "BRUISER," "LADY," or "WIMPY GUY" symbols do not provide a payoff in the basic game. However, a significant award may be expected in the BOWLING ROLL mode. It will be appreciated, however, the alternative embodiments within the scope of the present invention might provide a payoff for the combination of the "BRUISER," "LADY," or "WIMPY GUY" symbols prior to the BOWLING ROLL mode.

Once the BOWLING ROLL mode becomes active, the CPU 20 will execute a bowling game presentation. Briefly, the CPU 20 will present the animation of a frame of the bowling game. First, the CPU 20 randomly choose a number of pins that will be knocked down by each bowling roll of the frame. The CPU 20 also displays a window (not shown) illustrating a bowling lane with three arrows indicating the left, middle and right side of the lane. The player chooses an arrow by pressing the touch screen or an appropriate button (not shown) to indicate how the bowler should approach the bowling lane before releasing the bowling ball. The CPU 20 then illustrates the character that triggered the BOWLING ROLL mode, for this example the "WIMPY GUY," as the bowler making the chosen approach to roll the bowling ball at a set of bowling pins.

Figure 10:
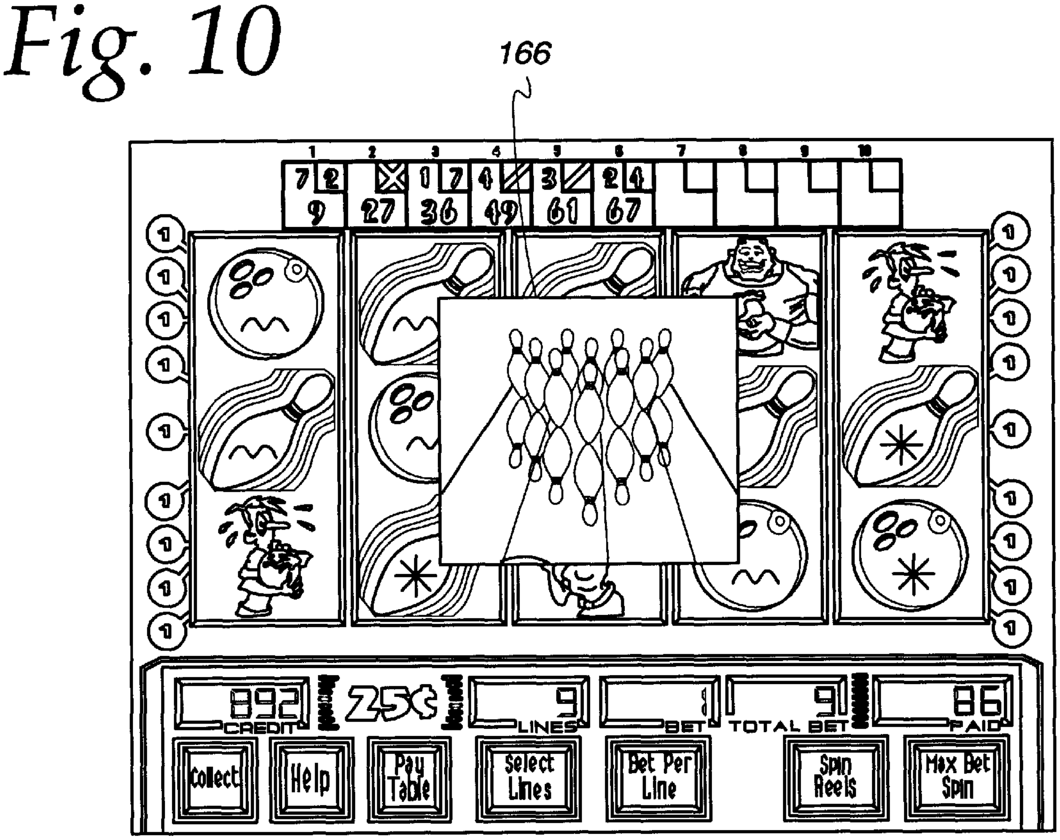
FIG. 10 shows an example animation of the BOWLING ROLL mode.
Figure 11:
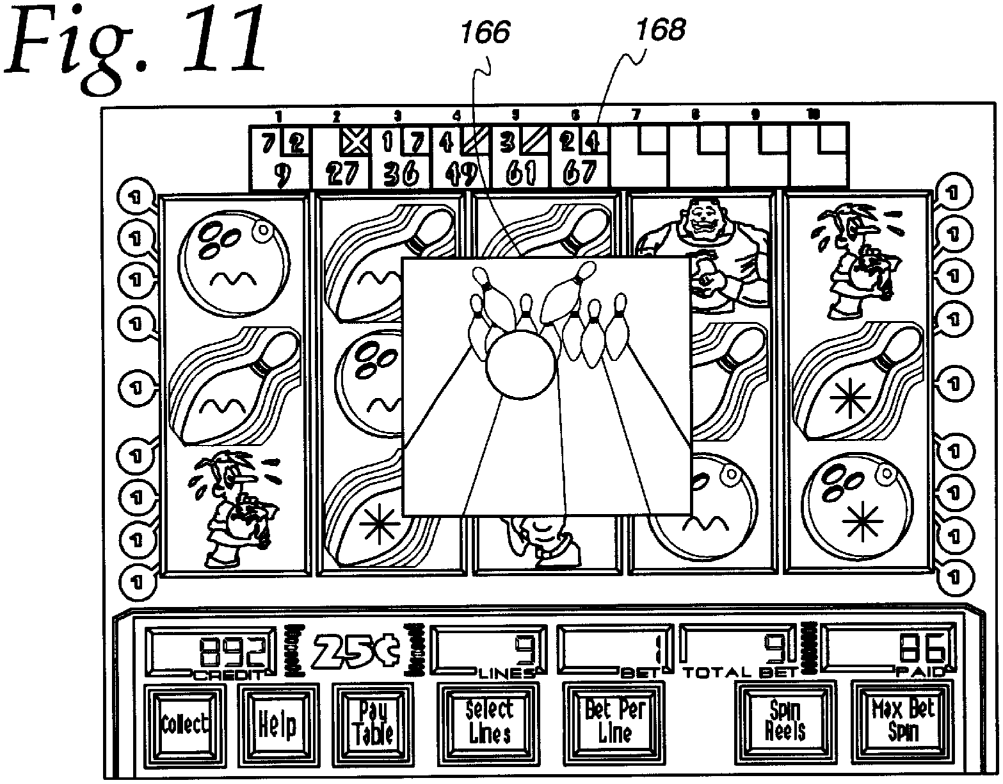
FIG. 11 shows an example of further animation of the BOWLING ROLL mode.
Figure 12:
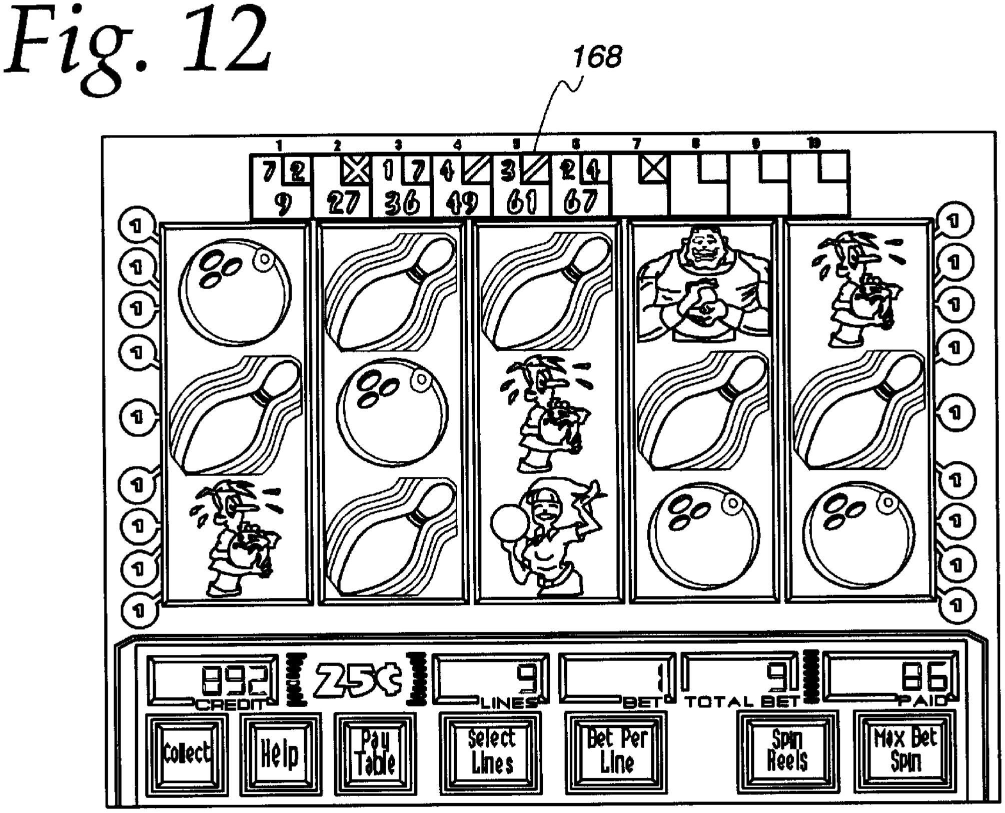
FIG. 12 shows an example of the results of the animation of the BOWLING ROLL mode.

The CPU 20 then animates a close up of the pins and the bowling ball rolling toward the pins as illustrated in FIGS. 10 and 11. As depicted in FIGS. 10, the BOWLING ROLL mode animates the motion of the bowling ball and the pins at the center position of reel 134 within a box 166 before illustrating the ball knocking down preselected pins in FIG. 11. As illustrated in FIGS. 10 and 11, the animation occurs within the box 166 that is larger than the center position of reel 134 but smaller than the entire display 12. Thus, the bowling roll animation covers a portion of the basic game screen less than the entire basic game screen on the display 12. In the illustrated embodiment, the box 166 covers half of each of the adjacent reel symbols resulting in the box 166 having a larger area than the area of the central position of the reel 134.

For the illustrated example, the bowling animation in the box 166 results in a strike by knocking down all of the pins. Once the pins have fallen, the CPU 20 places the score from the bowling roll in the score card 168. For this example with the strike, the CPU 20 has placed a "X" in the seventh frame of the score card 16 in FIG. 12. The score card 168 is a typical bowling game score card that maintains the game score and indicates how many rolls are left. Similar to the typical bowling game, the player will get two rolls in the first frame and after an open frame. The player will also get one roll after a strike or a spare. So for the example after the strike is rolled, the CPU 20 will randomly select the number of pins to knock down, animate the bowling roll and score the second roll similar to the first roll.

When the BOWLING ROLL mode does not provide a strike, the CPU 20 animates a second roll. For example, if on the first roll seven pins are knocked down, the CPU 20 will place a seven in the score card 168 similar to that displayed for the first frame. Next, the CPU 20 animates a second roll similar to the first roll with the motion of the bowling ball and pins except that only the pins that are standing after the first roll are displayed within the box 166. The CPU 20 animates the preselected pins being knocked over by the bowling ball and records the resulting score on the score card 168, such as two as shown in the first frame of the score card.

Once the bowling rolls have been executed, the CPU 20 provides an award to the player based on the total number of pins knocked down. In one embodiment, the product of the total number of pins knocked down and the total bet yields the payoff to the player. For example, if nine pins are knocked down, the payoff would be nine coins or credits for a total bet of one coin played and forty-five coins or credits for a total bet of five coins played. Thus, for the bowling game in the BOWLING ROLL mode, the payoff will be between zero and twenty times the total bet.

In an alternative embodiment, the product of the pins knocked down on each throw may be multiplied by the total bet to yield the payoff to the player. For example, if seven pins were knocked down on the first roll and two pins on the second roll, the product payoff would be fourteen coins or credits with a total bet of one coin. That same combination will pay seventy coins or credits for a bet of five coins. In a further embodiment, the payoff of BOWLING ROLL mode may be just the sum or product of the pins knocked down on each roll. For example, with seven and two combination of pins knocked down, the sum payoff would be nine credits or coins and the product payoff would be fourteen credits.

In yet another embodiment, the sum or product of the pins knocked down may be used as a multiplier applied to a basic game winning combination. For example, a basic game winning combination that pays ten coins or credits may be multiplied by either the sum or product of the pins knocked down. For example, in the seven and two combination, the sum of the nine may be multiplied by the basic payoff of ten to yield a total payoff of ninety coins or credits. In another embodiment, the product of the seven and two combination, namely fourteen, may be multiplied by the basic payoff of ten to yield a total payoff of one hundred forty coins or credits.

After the CPU 20 provides the BOWLING ROLL mode payoff to the player, the basic game resumes. In one embodiment, if the player completes a complete bowling game of all ten frames on the score card 168, the CPU 20 will illustrate a champion bowler on the display and notify the player whether the player beat the champion's score for the completed bowling game. If the player's score is higher than the champion's score, the CPU 20 provides a payoff of the difference between the player's score and the champion's score multiplied by the total line bet.

It will be appreciated that the present invention has generally been described with reference to a particular embodiment of the PERFECT GAME ™ game, but the present invention is not limited to the particular embodiments described here in. For example, while the aforementioned game has a basic game in the form of a slot machine, the present invention may be implemented with virtually any type of game of chance or skill or combination of such games. The basic game may comprise, for example, a video poker or video blackjack game. Other variations within the scope of the present invention include animation features with different themes, different displays and/or different types of award presentations; basic games with different numbers and types of reels and/or symbols, different payoff modes and/or payline configurations; and basic games, animation features or bonus games with different coin awards.

WHO DUNNIT?™

Figure 13:
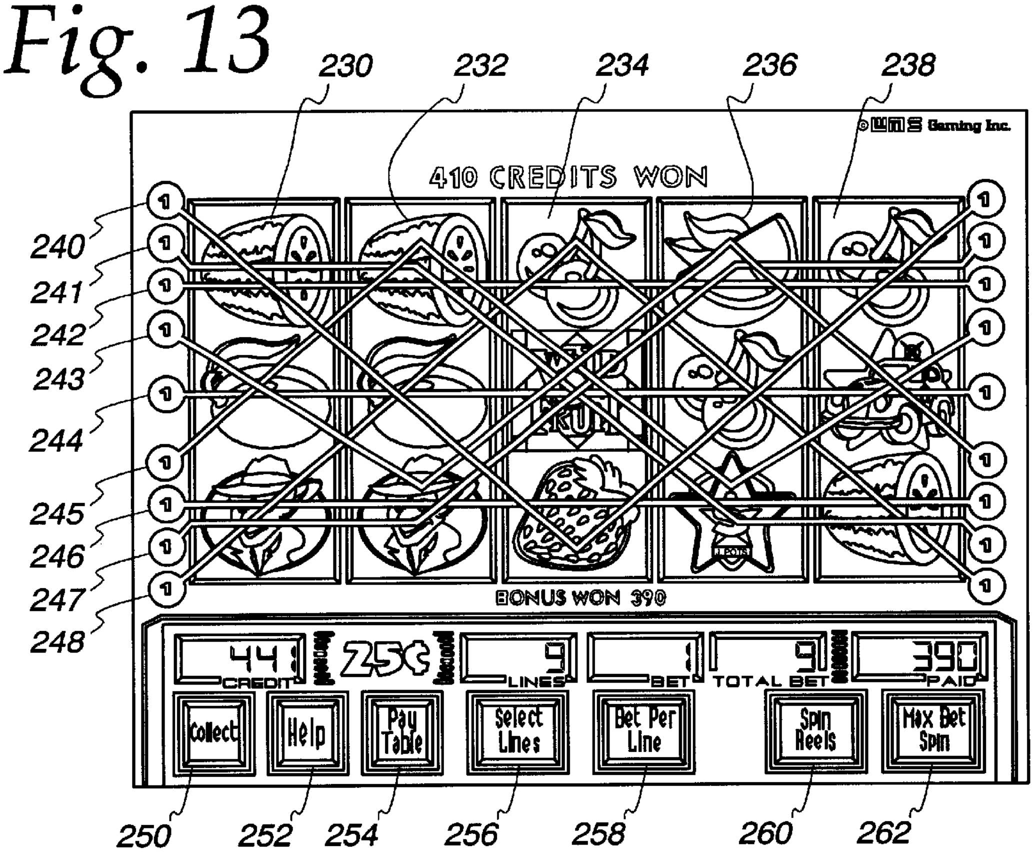
FIG. 13 is an illustration of a five-reel, nine-line game which is played on the video display of the video gaming machine of FIG. 1 according to further embodiment of the present invention.

The WHO DUNNIT?™ game is another game with a basic game and a reel animation feature that may be implemented on the video gaming machine 10. As shown in FIG. 13, the WHO DUNNIT?™ game is implemented on the video display 12. The CPU 20 provides a basic game screen comprising five video simulated spinning reels 230, 232, 234, 236 and 238 (hereinafter "reels") with nine payline 240–248 similar to the MONOPOLY—CHAIRMAN OF THE BOARD· game described above. Generally, game play is initiated by inserting a number of coins or playing a number of credits, causing the CPU 20 (FIG. 2) to activate a number of paylines corresponding to the number of coins or credits played. In one embodiment, the player selects the number of paylines (between one and nine) to play by pressing the "Select Lines" key 256 on the video display 12. The player then chooses the number of coins or credits to bet on the selected paylines by pressing the "Bet Per Line" key 258.

After activation of the paylines, the reels 230, 232, 234, 236 and 238 may be set in motion by touching the "Spin Reels" key 260 or, if the player wishes to bet the maximum amount per line, by using the "Max Bet Spin" key 262 on the video display 12. Alternatively, other mechanisms such as, for example, a lever or push butten may be used to set the reels in motion. The CPU 20 uses a random number generator (not shown) to select a game outcome corresponding to a particular set of reel "stop positions." The CPU 20 then causes each of the video reels 230, 232, 234, 236 and 238 to stop at the appropriate stop position. Video symbols are displayed on the reels 230, 232, 234, 236 and 238 to graphically illustrate the reel stop position and indicate whether the stop position of the reels represents a winning game outcome.

The various video symbols on reels 230 through 238 in one embodiment of the WHO DUNNIT?™ game relates to a mystery theme. The various symbols used in one embodiment of the WHO DUNNIT?™ game include: "LOGO," "DETECTIVE," "CAR," "BADGE," "CHERRY," "SIDEKICK," "MELON," "PLUM," "ORANGE," "STRAWBERRY," and "MAGNIFYING GLASS."

In the embodiment of FIG. 13, three symbols are displayed at three respective display positions (i.e., "upper," "center" and "lower") on each reel 230, 232, 234, 236, 238 thus defining a symbol group of fifteen symbols for each game outcome. Specifically, in the illustrated embodiment, reel 230 includes a "MELON" symbol in the upper display position, a "PLUM" symbol in the center display position and a "DETECTIVE" symbol in the lower display position. Reel 232 includes a "MELON" symbol in the upper display position, a "PLUM" symbol in the center display position and a "DETECTIVE" symbol in the lower display position. Reel 234 includes a "CHERRY" symbol in the upper display position, a "MAGNIFYING GLASS" symbol in the center display position and a "STRAWBERRY" symbol in the lower display position. Reel 236 includes a "ORANGE" symbol in the upper display position, a "CHERRY" symbol in the center display position and a "BADGE" symbol in the lower display position. Reel 238 includes a "CHERRY" symbol in the upper display position, a "CAR" symbol in the center display position and a "MELON" symbol in the lower display position.

In the embodiment of FIG. 13, each of the paylines 240–248 extends through one symbol on each of the five reels 230, 232, 234, 236 and 238. Payline 240 starts at the upper left symbol (e.g., "MELON") on reel 230, extends through the center symbol (e.g., "PLUM") on reel 232, the lower symbol (e.g., "STRAWBERRY") on reel 234, the center symbol (e.g., "CHERRY") on reel 236 and terminates at the top symbol (e.g., "CHERRY") on reel 238. Payline 241 starts at the upper left symbol (e.g., "MELON") on reel 230, extends through the upper symbol (e.g., "MELON") on reel 232, the center symbol (e.g., "MAGNIFYING GLASS") on reel 234, the lower symbol (e.g., "BADGE") on reel 236 and terminates at the lower symbol (e.g., "MELON") on reel 238. Payline 242 extends through the top symbol on each reel (e.g., "MELON" on reel 230, "MELON" on reel 232, "CHERRY" on reel 234, "ORANGE" on reel 236 and "CHERRY" on reel 238.) Payline 243 starts at the center symbol (e.g., "PLUM") on reel 230, extends through the lower symbol (e.g., "DETECTIVE") on reel 232, the center symbol (e.g., "MAGNIFYING GLASS") on reel 234, the top symbol (e.g., "ORANGE") on reel 236 and terminates at the center symbol (e.g., "CAR") on reel 238. Payline 244 extends through the center symbol on each reel (e.g., "PLUM" on reel 230, "PLUM" on reel 232, "MAGNIFYING GLASS" on reel 234, "CHERRY" on reel 236 and "CAR" on reel 238.) Payline 245 starts at the center symbol (e.g., "PLUM") on reel 230, extends through the upper symbol (e.g., "MELON") on reel 232, the center symbol (e.g., "MAGNIFYING GLASS") on reel 234, the lower symbol (e.g., "BADGE" on reel 236 and terminates at the center symbol (e.g., "CAR") on reel 238. Payline 246 extends through the lower symbol on each reel (e.g., "DETECTIVE" on reel 230, "DETECTIVE" on reel 232, "STRAWBERRY" on reel 234, "BADGE" on reel 236 and "MELON" on reel. 238.) Payline 247 starts at the lower symbol (e.g., "DETECTIVE") on reel 230, extends through the lower symbol (e.g., "DETECTIVE") on reel 132, the center symbol (e.g., "MAGNIFYING GLASS") on reel 234, the upper symbol (e.g., "ORANGE") on reel 236 and terminates at the upper symbol (e.g., "CHERRY") on reel 238. Payline 248 starts at the lower symbol (e.g., "DETECTIVE") on reel 230, extends through the center symbol (e.g., "PLUM") on reel 232, the upper symbol (e.g., "CHERRY") on reel 234, the center symbol (e.g., "CHERRY") on reel 236 and terminates at the lower symbol (e.g., "MELON") on reel 238.

In one embodiment, the CPU 20 checks the symbol groups of the "basic" game outcomes for winning combinations. Certain predefined winning symbol combinations appearing in the symbol group relative to an active payline are winning outcomes. The winning combinations are preferably identified on a pay table that is affixed to the machine 10 and/or displayed by the video display 12 in response to a command by the player (e.g., by pressing the "Pay Table" button 254). The pay table enables the player to view the winning combinations and their associated payoff amounts. If the symbol group includes a winning combination, the game credits the player an amount corresponding to the award in the pay table for that combination multiplied by the amount of credits bet. The player may collect the amount of accumulated credits by pressing the "Collect" button 250.

TABLE 2

WHO DUNNIT? ™ PAY TABLE

| WIN COMBINATIONS | | | | | PAY |
|---|---|---|---|---|---|
| Logo | Logo | Logo | Logo | Logo | 5000 |
| Logo | Logo | Logo | Logo | | 400 |
| Logo | Logo | Logo | | | 100 |
| Logo | Logo | | | | 15 |
| Logo | | | | | 2 |
| Car | Car | Car | Car | Car | 1000 |
| Car | Car | Car | Car | | 200 |
| Car | Car | Car | | | 60 |
| Badge | Badge | Badge | Badge | Badge | 300 |
| Badge | Badge | Badge | Badge | | 80 |
| Badge | Badge | Badge | | | 25 |
| Melon | Melon | Melon | Melon | Melon | 250 |
| Melon | Melon | Melon | Melon | | 60 |
| Melon | Melon | Melon | | | 25 |
| Plum | Plum | Plum | Plum | Plum | 200 |
| Plum | Plum | Plum | Plum | | 50 |
| Plum | Plum | Plum | | | 20 |
| Orange | Orange | Orange | Orange | Orange | 150 |

TABLE 2-continued

WHO DUNNIT? ™ PAY TABLE

| WIN COMBINATIONS | | | | | PAY |
|---|---|---|---|---|---|
| Orange | Orange | Orange | Orange | | 40 |
| Orange | Orange | Orange | | | 15 |
| Straw-berry | Straw-berry | Straw-berry | Straw-berry | Straw-berry | 100 |
| Straw-berry | Straw-berry | Straw-berry | Straw-berry | | 30 |
| Straw-berry | Straw-berry | Straw-berry | | | 10 |
| Cherry | Cherry | Cherry | Cherry | Cherry | 80 |
| Cherry | Cherry | Cherry | Cherry | | 20 |
| Cherry | Cherry | Cherry | | | 7 |

Table 2 is a pay table identifying various winning combinations of symbols in the WHO DUNNIT™ basic game. The "WIN COMBINATIONS" portion identifies the various symbol combinations providing a payoff when they stop on the designated reels of an active payline in the first payoff mode. The specific type(s) and number(s) of symbol combinations define the various winning combinations. Generally, except for the "LOGO" combination, winning combinations require that at least three of five corresponding symbols be displayed on the active payline on the designated reels. The basic game is a left and right pay, so three "MELON" symbols on reels 230 through 234 or on reels 234 through 238 are winning combinations. For example, the symbol combinations of five "CAR" symbols (i.e. on reels 230 through 238), four "CAR" symbols (i.e. on reels 230 through 236 or reels 232 through 238) and three "CAR" symbols (i.e. on reels 230 through 234 or reels 234 through 238) stopping on the payline provide a payoff. As shown in Table 2, the "LOGO" symbol has four winning combinations in the WHO DUNNIT?™ basic game, including: five "LOGO" symbols (i.e. on reels 230 through 238), four "LOGO" symbols (i.e. on reels 230 through 236 or reels 232 through 238), three "LOGO" symbols (i.e. on reels 230 through 234 or reels 234 through 238), and two "LOGO" symbols (i.e. on reels 230 through 232 or reels 236 through 238).

The "PAY" column of Table 2 identifies the amount of coin(s) or credit(s) awarded as the payoff for the various winning combinations in the basic game, per unit wagered. Thus, for example, the "LOGO," "LOGO" combination will pay fifteen coins or credits with one coin played; that same combination will pay seventy-five coins or credits with five coins played.

In one embodiment, a "MAGNIFYING GLASS" symbol positioned on reel 234 acts as a wild for the fruit symbols: "CHERRY," "MELON," "PLUM," "ORANGE," "STRAWBERRY." For example in FIG. 14 on payline 244, the combination of two "PLUM" symbols and the "MAGNIFYING GLASS" symbol on reels 230 through 234 is a winning combination equivalent to three "PLUM" symbols providing a basic game payoff of 20 coins or credits for one coin played.

Figure 14:
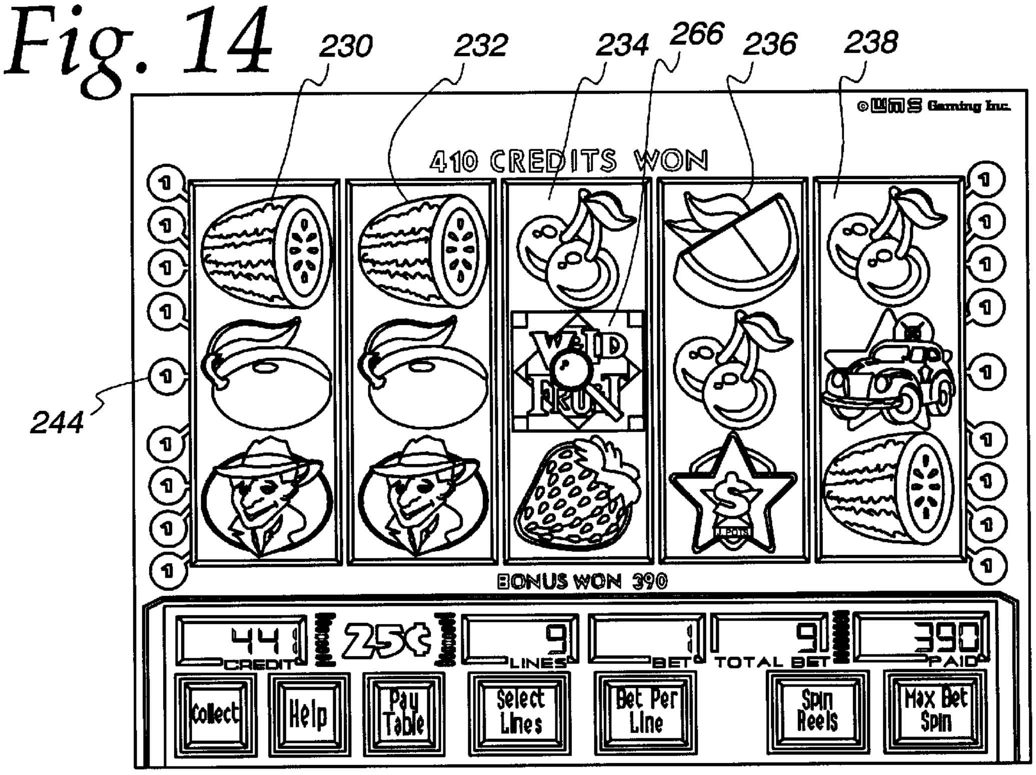
FIG. 14 shows an outcome of the game of FIG. 13 which will trigger a MAGNIFYING GLASS mode.
Figure 15:
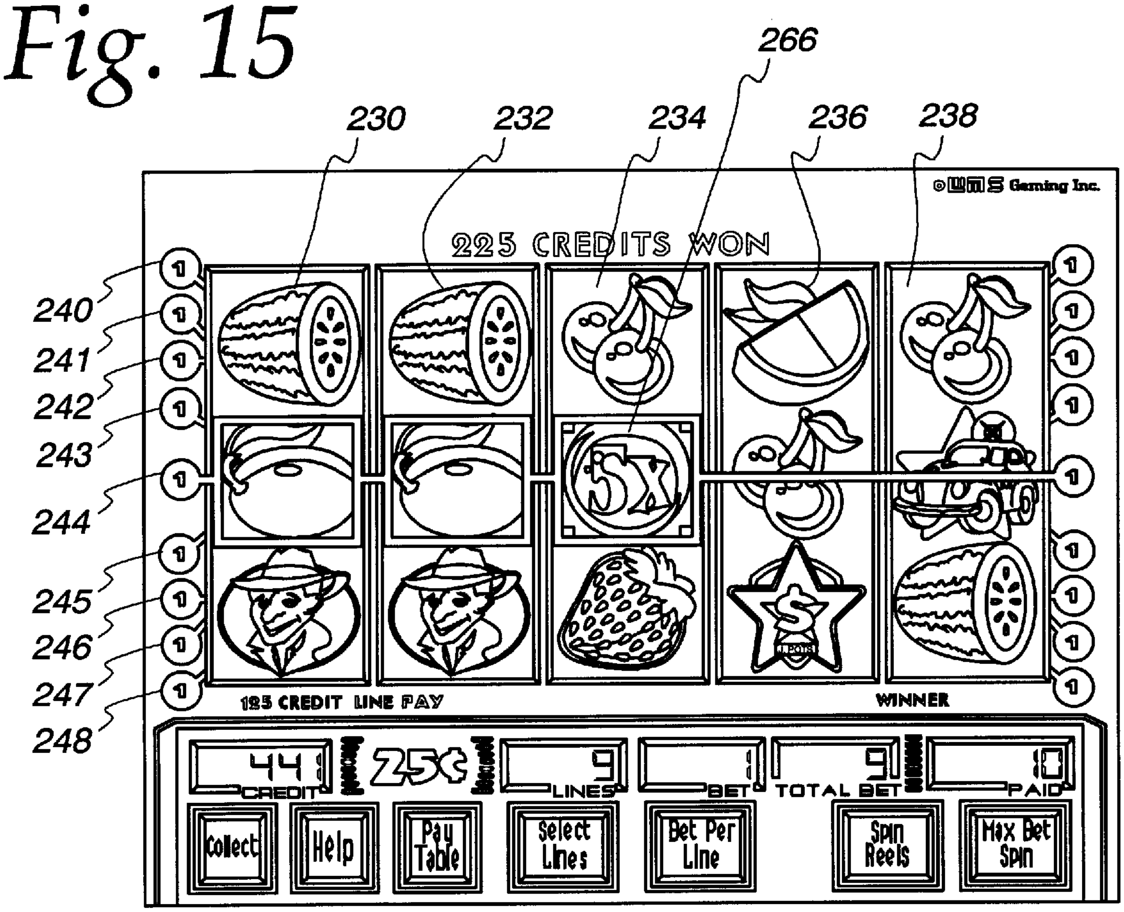
FIG. 15 shows an example animation of the MAGNIFYING GLASS mode.

In one embodiment, in addition to acting as a wild for the fruit symbols, the "MAGNIFYING GLASS" symbol provides an animation feature or first screen bonus game called the MAGNIFYING GLASS mode. The CPU 20 randomly preselects a number for the outcome of animation feature. The CPU 20 then illustrates the animation feature by revealing the preselected number behind the "MAGNIFYING GLASS" symbol. The animation feature proceeds automatically without a triggering input from the player. FIGS. 14 and 15 depicts the animation. FIG. 14 illustrates the "MAGNIFYING GLASS" symbol at the center position of reel 234. The "MAGNIFYING GLASS" symbol slowly disappears to reveal the number five at the center position of reel 234 in a symbol box 266 as illustrated in FIG. 15.

Once the "MAGNIFYING GLASS" symbol reveals the number, the CPU provides an award to the player based on the revealed number. In one embodiment, the award is the revealed number applied as a multiplier to the basic game payoff. For the illustrated example of FIGS. 14 and 15, the basic game winning combination is three "PLUM" symbols that pays twenty credits or coins for one coin played. The multiplier of five is then multiplied by the basic game payoff, so the resulting payoff for the animation feature is one hundred credits or coins (e.g., five times twenty) for one coin played.

In an alternative embodiment, the number revealed under the "MAGNIFYING GLASS" symbol may be provided to the player as a credit. For example, if the "MAGNIFYING GLASS" symbol revealed the number five, the CPU 20 awards the player five coins or credits for one coin played or twenty five coins or credits for five coins played.

In another embodiment, the "MAGNIFYING GLASS" animation may reveal a number indicating an award of free spins. For example, the "MAGNIFYING GLASS" animation may reveal a five. In this embodiment, the five would indicate five free reel spins in the basic game. After the five is revealed, the CPU 20 returns to the basic game and allows the player to spin the reels five times before requiring a new deposit of coins or credits.

In a further embodiment, the "MAGNIFYING GLASS" animation may reveal a special picture that triggers a second screen bonus game. For example, the "MAGNIFYING GLASS" symbol may reveal a criminal character that would trigger the CPU 20 to display a second screen bonus game. The second screen bonus game would replace the reels and symbols on the display with a new illustration. The new illustration on the display would provide the player with a payoff.

It will be appreciated that the present invention has generally been described with reference to a particular embodiment of the WHO DUNNIT?™ game, but the present invention is not limited to the particular embodiments described herein. For example, while the aforementioned game has a basic game in the form of a slot machine, the present invention may be implemented with virtually any type of game of chance or skill or combination of such games having outcomes (e.g., "start bonus" outcomes) which may trigger play of an animation feature or other bonus game. The basic game may comprise, for example, a video poker or video blackjack game. Other variations within the scope of the present invention include bonus games with different themes, different displays and/or different types of award presentations; basic games with different numbers and types of reels and/or symbol-s, different payoff modes and/or payline configurations; and basic or bonus games with different coin awards.

While the present invention has been described with reference to one or more particular embodiments, those skilled in the art will recognize that many changes may be made thereto without departing from the spirit and scope of the present invention. Each of these embodiments and obvious variations thereof is contemplated as falling within the spirit and scope of the claimed invention, which is set forth in the following claims.

What is claimed is:

1. A gaming machine, comprising:

a basic game controlled by a processor in response to a wager amount, said basic game having a first display screen and at least one start bonus cutcome occurring within said first display screen; and a bonus game activated by said start bonus outcome which causes said processor to provide an animation covering a portion less than all of said first display screen, said animation occurring automatically in response to said start bonus outcome without a triggering input from a player, said animation providing an animation payoff.

2. The gaming machine of claim 1 wherein said first display screen includes a spinning reel display showing a plurality of symbols on each of a plurality of rotatable reels.

3. The gaming machine of claim 2 wherein said start bonus outcome includes predetermined combinations of start animation symbols at predetermined locations on said reels.

4. The gaming machine of claim 1 wherein said animation being generally confined to least one of said start animation symbol locations on said reels.

5. The gaming machine of claim 3 wherein said animation being generally confined to an area larger than one of said start animation symbol reel locations.

6. The gaming machine of claim 2 wherein said animation feature being confined to a box centered on said basic game screen.

7. The gaming machine of claim 2 wherein said animation payoff is a multiplier applied to said wager amount.

8. The gaming machine of claim 2 wherein said animation payoff is a credit.

9. The gaming machine of claim 2 wherein said basic game has a basic game winning outcome providing a basic game payoff, said animation payoff being a multiplier applied to said basic game payoff.

10. The gaming machine of claim 2 wherein said animation is a magnifying glass revealing a number.

11. The game machine of claim 2 wherein said animation payoff triggers a second screen bonus game that provides a second screen payoff.

12. The gaming machine of claim 2 wherein said animation payoff is said basic game without depositing said wager amount.

13. A method of operating a gaming machine under control of a processor comprising:

providing a basic game having at least one start bonus outcome;

placing a wager amount on said basic game;

playing said basic game; and automatically providing an animation in response to said start bonus outcome without a triggering input from a player, said animation being generally confined to a location of said start bonus outcome, said animation providing an animation payoff.

14. The method of claim 13 wherein said basic game includes a spinning reel display showing a plurality of symbols on each of a plurality of rotatable reels.

15. The method of claim 14 wherein said start animation outcome includes predetermined combinations of start animation symbols at predetermined locations on said reels.

16. The method of claim 5 wherein said animation occurs on least one of said start animation symbol locations on said reels.

17. The method of claim 13 wherein said animation payoff is a multiplier applied to said wager amount.

18. The method of claim 13 wherein said animation payoff is a credit.

19. The method of claim 13 wherein said animation is a magnifying glass revealing a number.

20. The method of claim 13 wherein said basic game has a plurality of basic game winning outcomes providing a basic game payoff, said animation payoff being a multiplier applied to said basic game payoff.

21. The method of claim 19 wherein said start animation symbol acts as a wild for said basic game winning outcomes.

22. A gaming machine controlled by a processor in response to a wager, comprising a video display depicting a plurality of symbols randomly placed in a symbol array, the symbol array including a plurality of locations containing the respective symbols, the plurality of symbols including one or more quantity-based symbols, the quantity-based symbols being inherently perceived by their appearance to be capable of defining a plurality of values, each of the quantity-based symbols being animated in its respective location to display one of the values, the processor awarding a payoff based on the values displayed by the respective quantity-based symbols.

23. The gaming machine of claim 22, wherein each of the quantity-based symbols is animated in response to a start-animation outcome represented by the randomly placed symbols.

24. The gaming machine of claim 22, wherein the payoff is determined by multiplying the wager by a sum of the values.

25. The gaming machine of claim 22, wherein the payoff is determined by multiplying the wager by a product of the values.

26. The gaming machine of claim 22, wherein the quantity-based symbols are dice symbols.

27. The gaming machine of claim 26, wherein each of the dice symbols is animated to roll and display one face of the associated dice symbol, the value of the animated dice symbol being determined by a number of dots on the displayed face.

28. A gaming machine controlled by a processor in response to a wager, comprising a plurality of symbol-bearing reels simulated on a video display, the reels being rotated and stopped to randomly place symbols on each reel in visual association with a symbol array, the symbol array including a plurality of locations containing the respective symbols, the plurality of symbols including one or more quantity-based symbols, the quantity-based symbols being inherently perceived by their appearance to be capable of defining a plurality of values, each of the quantity-based symbols being animated in its respective location to display one of the values, the processor awarding a payoff based on the values displayed by the respective quantity-based symbols.

29. The gaming machine of claim 28, wherein the quantity-based symbols are dice symbols.

30. The gaming machine of claim 29, wherein each of the dice symbols is animated to roll and display one face of the associated dice symbol, the value of the animated dice symbol being determined by a number of dots on the display face.

31. A method of operating a gaming machine, comprising:

randomly placing a plurality of symbols in a symbol array depicted on a video display, the symbol array including a plurality of locations containing the respective symbols, the plurality of symbols including one or more quantity-based symbols, the quantity-based symbols being inherently perceived by their appearance to be capable of defining a plurality of values;

animating each of quantity-based symbols in its respective location to display one of the values; and awarding a payoff based on the values displayed by the respective quantity-based symbols.

32. The method of claim 31, wherein the step of randomly placing a plurality of symbols includes rotating and stopping a plurality of symbol-bearing reels simulated on the video display.

33. The method of claim 31, wherein the step of animating each of the quantity-based symbols occurs in response to a start-animation outcome represented by the randomly placed symbols.

34. The method of claim 31, wherein the quantity-based symbols are dice symbols.

35. The method of claim 34, wherein the step of animating each of the quantity-based symbols includes rolling and displaying one face of the associated dice symbol, the value of the animated dice symbol being determined by a number of dots on the display face.

* * * * *

UNITED STATES PATENT AND TRADEMARK OFFICE

CERTIFICATE OF CORRECTION

PATENT NO. : 6,270,411 B1
DATED : August 7, 2001
INVENTOR(S) : Gura et al.

It is certified that error appears in the above-identified patent and that said Letters Patent is hereby corrected as shown below:

<u>Column 17,</u>
Line 5, delete "cutcome" and insert -- outcome --
Line 22, after "to" insert -- at --
Line 63, delete "5" and insert -- 15 --

<u>Column 20,</u>
Line 7, delete "display" and insert -- displayed --

Signed and Sealed this

First Day of April, 2003

JAMES E. ROGAN
*Director of the United States Patent and Trademark Office*